United States Patent [19]
van der Linde

[11] Patent Number: 4,868,480
[45] Date of Patent: Sep. 19, 1989

[54] ELECTRIC POWER GENERATOR

[76] Inventor: Hendrik S. van der Linde, P.O. Box 8390, Pretoria, South Africa, 0001

[21] Appl. No.: 68,330

[22] Filed: Jun. 9, 1987

[30] Foreign Application Priority Data

Oct. 6, 1986 [ZA] South Africa .............. 86/4314

[51] Int. Cl.⁴ ............. H02J 3/12; H02J 4/00
[52] U.S. Cl. ............. 322/7; 307/10.1; 307/16; 322/90
[58] Field of Search ........ 307/10 R, 16; 322/7, 322/8, 90; 219/202

[56] References Cited
U.S. PATENT DOCUMENTS 3,471,706  10/1969  Schneider .......... 307/10 R
3,655,991  4/1972   Schneider .......... 307/10 R
3,857,084  12/1974  Allport ............... 322/28
3,894,242  7/1975   Helling .............. 322/7 X Primary Examiner—R. J. Hickey
Attorney, Agent, or Firm—Berman, Aisenberg & Platt

[57] ABSTRACT

Accessory for a motor vehicle alternator which is delta wound and has a full wave rectifier bridge to provide output selected from normal operation of vehicle electrics, arc welding, fast battery charging and high voltage supply to extraneous appliances. A double pole single throw switch selects either normal voltage regulated shunt excitation or disables voltage regulation, provides battery excitation and charge warning via a light which indicates not only alternator failure but also supply for welding, fast charging or extraneous appliances.

2 Claims, 1 Drawing Sheet

ELECTRIC POWER GENERATOR

BACKGROUND

1. Field of the Invention

This invention relates to power supply systems associated with rotational machinery used for developing electrical power for a variety of uses. The invention is particularly concerned with the provision of electrical power in a variety of convenient forms from a vehicle for the convenience of the mobility and portability of this source of power. The prime mover is thus the vehicle engine supplied by its fuel be it petrol or diesel and the invention is concerned with the provision of a power supply system associated with a generator of electrical power in such a vehicle which has the capacity to supply useful power in various alternative modes of use of the generator in addition to its conventional purpose in the electrical system of the vehicle.

2. Related Art

It is well established in vehicles to provide an alternator whose output is rectified and supplied at a suitable D.C. voltage to the vehicle system for operation of the electrical components of the vehicle and for maintaining the charge of the vehicle battery, a lead acid accumulator. Such alternators are adapted for this purpose and are not suitable for the supply of electrical power to loads outside the vehicle such, for example as electric arc welders, heavy electric hand drills and angle grinders, electric lighting and the like. S.A. Pat. No. 69/8205 dated 24/11/69 (Bosch) described an alternator for trains to supply both 24 volts and 220 volts by having two inductively coupled output windings in the alternator. U.S Pat. No. 3 689 826 issued Sept. 5, 1972, (Motorola) described the alternative connection of the alternator winding in series, star (wye) and delta connections and showed the usual full wave rectifying bridge. S.A. Pat. No. 84/1794 dated 9/03/84 (Ayr) described adaptation of a motor vehicle power source for extraneous electrical appliances using pumping action of a capacitor bridge circuit to supply an enhanced level of DC vehicle. However, the complex electric circuits have disadvantages in two areas, namely cost and reliability.

SUMMARY OF THE INVENTION

An object of this invention is to provide a power supply system for a motor vehicle alternator for extraneous electrical appliances which avoids complexity yet is versatile.

Another object of the invention is to provide a circuit whereby the voltage regulator may be disabled to allow the alternator output voltage to be raised by raising the rotor speed to supply in a simple manner a required high output voltage for extraneous appliances.

Another object of the invention is to provide a circuit whereby the vehicle charged warning light may give a warning signal when extraneous electrical appliances are being supplied instead of the vehicle battery.

Another object of the invention is to provide with these features the versatility of selection of output from lighting, welding, 220 V DC for angle grinders etc., high speed (40 A) battery charging and normal operation.

A final object is to provide automatic voltage control of the power driven by a vehicle engine related to the selected output voltage.

A power system for a motor vehicle alternator in accordance with this invention whose three phase windings are connected in delta connection and fed to a full wave rectifying bridge having a plug feed from the rectified current for welding equipment, having a plug connected to the delta connection for three phase alternating current for high voltage supply to extraneous appliances and characterised by a double pole single throw switch a first pole of the switch closing to connect normal voltage regulated shunt excitation of the alternator for supply in the vehicle and opening to connect battery excitation and effectively disable the voltage regulation of alternator output voltage a second pole of the switch closing to connect a coil of a relay between a delta connection and earth, a charging warning light being connected via single pole normally closed points of said relay between a battery and earth.

In accordance with a preferred embodiment of the invention there is further provided a step-up transformer and rectifier with a plug socket connectible with the plug for high voltage supply to extraneous appliances with an output voltage sensing and indicating means. As discussed in S.A. Pat. No. 84/1794 (Ayr) output voltage can be directly controlled by adjusting the rotor speed but cumbersome and complex electromechanical devices have caused a major drawback in this approach. In a simplified application of the present invention a hand throttle which may be set is adjusted by the user to get a required output voltage as indicated by the voltage sensing and indicating means, e.g. voltmeter or lights array.

BRIEF DESCRIPTION OF THE DRAWINGS

The invention is more fully described by way of an example with reference to the accompanying drawings in which:

FIG. 2 is a circuit diagram of the transformer rectifier for supplying high voltage DC to extraneous appliances.

DESCRIPTION OF THE PREFERRED EMBODIMENT

Figure 1:
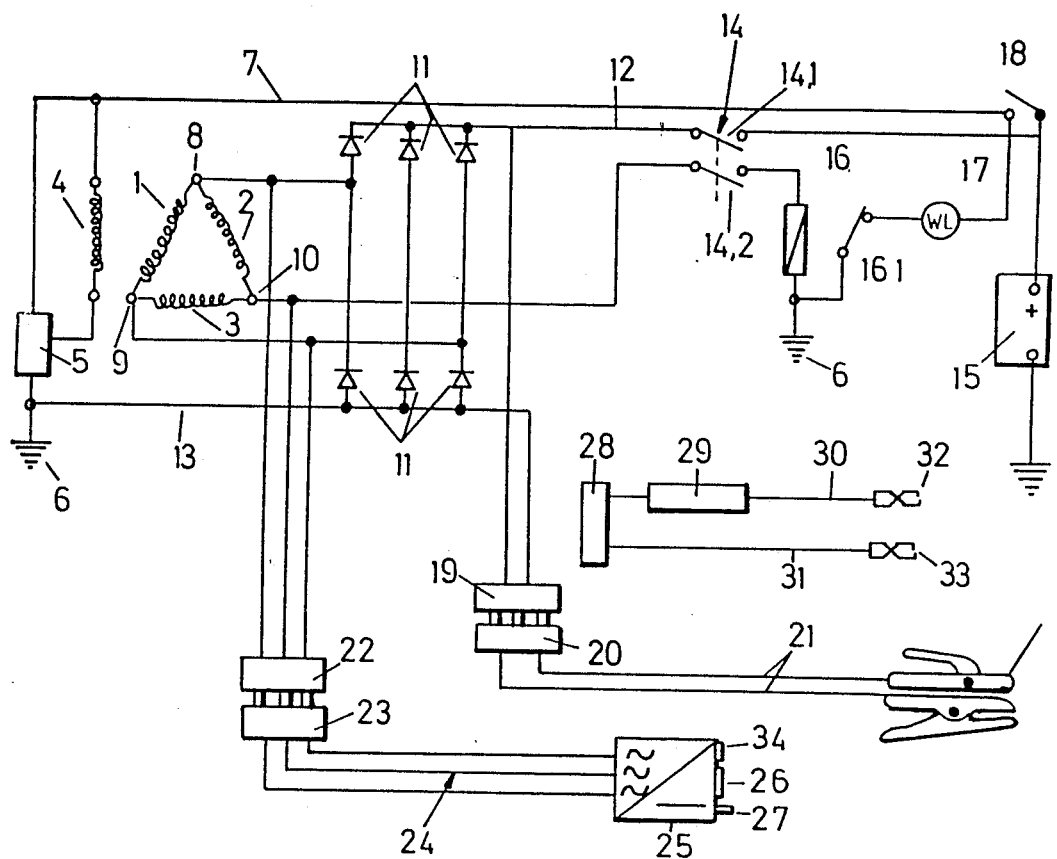
FIG. 1 is a circuit diagram of a preferred embodiment of the invention providing either normal vehicle operation, DC welding, high voltage DC for extraneous electrical appliances or high rate of charge battery charging.

As shown in FIG. 1 the stator windings of 1, 2 and 3 of the alternator are connected to delta connection and the rotor winding 4 is connected with a voltage regulator unit 5 between earth 6 (the alternator frame and vehicle chassis) and the citation supply line 7. The delta connections 8, 9 and 10 of the stator windings are connected to a full wave rectifier bridge comprising six rectifiers 11 to provide a DC output between the positive line 12 and the negative earth line 13. A double pole single throw switch 14 is a first pole 14,1 closing to connect the positive DC output line 12 with the battery 15 and opening to isolate the line 12 from the battery 15. The second pole 14,2 of the switch closes to connect a coil 16 of a relay between a delta connection point 10 and earth 6. The relay coil 16 actuates a single pole normally closed relay 16,1 and a charge warning light 17 between battery 15 and earth 6. The usual vehicle ignition switch 18 opens to disconnect the battery from the system. A plug 19 is permanently connected to the positive line 12 and earthed negative line 13 for connection of a plug 20 from which are led welding cables 21 for DC arc welding. This permanent connection avoids the risk of the burning of switch contact points which would arise if a single pole two throw switch was used to select between normal operation of the vehicle system which would charge the battery and alternatively welding current supply. A plug 22 has three cables connected to the delta connections 8, 9 and 10 for supply of a three phase alternating current which may be connected by a plug 23 and three core cable 24 to a step-up transformer rectifier unit 25. The unit 25 has a plug socket 26 and switch 27 for the supply of high voltage DC for extraneous appliances at 220 volts. Of course, a 100 volt output could be supplied where required. A plug 28 may be connected to the plug 19 as an alternative and incorporates a resistor 29 of 500 ohms in the leads 30 and 31 which terminate in clamps 32 and 33 for connection to battery posts with the purpose of providing a fast charge, for example, of flat batteries say at 40 amps.

The operation of the circuit may be described as follows. Consideration will first be given to normal operation for the purposes of the vehicle electrical systems and excluding the extraneous appliances. For this purpose the switch 14 is closed. The ignition switch 18 of the vehicle is switched on which immediately connects the battery voltage across the charge warning light 17 via the relay 16,1 to earth 6 thus igniting the charge warning light. The vehicle engine is then started and the EMF generated in the alternator windings activates the relay 16 when a sufficient EMF level has been attained to open the relay 16,1 thereby switching off the charge warning light 17 to indicate satisfactory charge from the alternator. The alternator output recitifed by the bridge 11 and available via the line 12 charges the battery 15 and energises the rotor windings 4 while the voltage regulator 5 detects the level of the output voltage from the alternator. As the engine speeds up a resulting increase in voltage of the alternator output is detected by the regulator 5 which then applies compensating impedance to reduce the excitation available to the rotor windings 4 to preserve the alternator output sensibly constant, for example, at 14.7 volts for appropriate maintenance charging of the battery 115 and supply of the electrical systems of the vehicle in normal way.

In order to supply extraneous appliances the switch 14 is opened which has two effects immediately. First of all only the 12 volts supply of the battery becomes available at the rotor coils 4 and at the voltage regulator 5. Since this voltage remains at 12 volts irrespective of the alternator speed the regulator 5 becomes effectively disconnected from the output voltage of the alternator and effectively disabled no longer applying any correction factor to the excitation current. It does remain set in the mode in which maximum excitation is applied to the rotor coil 4. The second effect is that the relay coil 16 is immediately de-energised allowing the relay points 16,1 to close to their normally closed position and therefore immediately igniting the charge warning light. This serves the useful purpose thus of a reminder to the operator of the vehicle that the vehicle is in abnormal condition, namely supplying power to extraneous appliances and not supplying power to the motor vehicle battery. Under these conditions the desired extraneous appliances may be connected by use of the appropriate plug. The engine is provided with a hand throttle by means of which its speed can be raised to about 3000 rpm and at this speed, lacking any influence from the voltage regulator 5 the alternator will supply about 40 volts. The 40 volts DC at plug 19 can then be used for welding or the 40 volts AC at plug 22 is converted by the transformer rectifier unit 25 to provide 220 volts DC at plug 26. A voltmeter 34 on the unit 25 can be observed while hand adjusting the engine speed to get exactly the right output voltage of 220 volts at this point.

DESCRIPTION OF VOLTAGE REGULATOR FOR 220 V OUTPUT FROM CAR ALTERNATOR

The transformer/rectifier shown in FIG. 2 can supply 220 V DC from a car alternator, but has a serious disadvantage: the voltage is not regulated, therefore when the load is reduced, the voltage rises considerably and can cause problems under certain circumstances.

To solve this problem the circuit has been extended to allow the built-in regulator of the normal vehicle electrical system to double-up as regulator for the 220 V output as well. In the new design the box containing the transformer/rectifier as well as the voltage regulator from one integral unit together with the alternator and can not be used separately.

As before there is a double pole isolator but in addition a toggle switch to select the different operating modes:

(I) Normal operation

For normal operation (car running) the isolator is on and the toggle switch is off. From the AC 3 phase output of the alternator a sense voltage is obtained via 3 diodes. They are connected in 3 phase half wave rectifier configuration. The resulting DC voltage is fed to the regulator built into the alternator via one contact of the isolator. The other contact connects the DC output of the alternator to the battery to enable charging and to supply the ignition. From the ignition a wire feeds through a blocking diode and a limiting resistor to the regulator to supply the starting excitation required when starting the engine. Soon the voltage will rise and the regulator will stabilize the output depending on the sense voltage supplied by the diodes. The diode from the ignition is then blocked and has no further influence.

(II) Welding

Now the isolator has to be switched off. One open contact prevents over charging the battery while welding, while the other one interrupts the feedback signal from the 3 diodes. The excitation is now obtained from the battery via the blocking diode, but the regulator will not limit because the voltage is too low. Therefore the alternator will supply the maximum power possible to enable welding.

(III) 220 V Output

In this mode the isolator is also off and the toggle switch must be on. It has two contacts; the one switches the 220 V output on, and the other one connects the alternator regulator to an auxiliary voltage. This auxiliary voltage is obtained from the 3 phase transformer by means of separate secondary windings. It's 3 phases are rectified by a 3 phase bridge rectifier consisting of six silicone diodes. The resulting DC voltage is proportional to the output on the 220 V side with exception of a moderate voltage drop in the winding and the diodes. When the output rises too high, this DC voltage will also rise and when it reaches approximately 14 V the regulator will limit the output of the alternator, thus keeping the output virtually constant. The auxiliary supply is designed to deliver 14 V when the output is 220 V to stablize the voltage around 220 V.

(TV) Charge indicator

The "charge" indicator on the dashboard is operated by an electronic circuit. During normal mode (isolator on-toggle switch off) the excitation voltage operates the lamp via NPN transistor. Only when the voltage rises about 12 V, due to charge current raising the battery voltage, will the light go off. This is achieved by an analogue integrated circuit, which shorts the base of the transistor when 12 V is exceeded. In welding or 220 V mode the battery is not being charged and the voltage can not rise above 12 V. Therefore the indicator light will be on all the time to remind the operator that the isolator and the switch must be returned to normal position after use.

DESCRIPTION OF CHARGE ADAPTOR

To enable charging of 24 V batteries (or even higher up to 48 V) with a car alternator incorporating the transformer/rectifier the adaptor consists of a plug fitting into the welding socket, a connecting cable, a current limiting wire wound resistor in a protective case, and output cables with battery clamps.

The welding mode must be selected. The adaptor is then plugged into the welding socket and the clamps connected to the battery in correct polarity (red positive and black negative). When the engine runs fast enough, the output will exceed 50 V. The resistor will drop the voltage and limit the current at 24 V to between 25 and 30A.

DESCRIPTION OF PROPOSED IMPROVEMENT FOR CAR SUPPLY SYSTEM

Manufacturing of the modified car alternators with the transformer/rectifier for welding and 220 V supply proved difficult and labour intensive because of the extensive modifications required in the alternator. A possible saving could be achieved by getting the alternators manufactured without the diodes and the regulator. Only a direct 3 phase AC output and the excitation input would be required. Because of the integration of the slip rings into the regulator module, the "Bosh" alternator may not be very suitable for this approach.

The transformer/rectifier box becomes then more complex because the main diodes and their associated heat sinks, as well as the sensing diodes and the regulator will have to be mounted there. Advantages are lower labour costs and lower losses inside the alternator, as well as cooler running diodes. Disadvantages are the higher parts costs and the special alternator required.

I claim:

1. A power system for a motor vehicle having a battery, an alternator with three-phase windings connected in delta connection, a field coil, a voltage regulator, and a charge warning light connected to come on when the battery is not being charged, the power system comprising: a full wave rectifying bridge, connected to the alternator windings which feed the bridge, a first plug means connected to the bridge for providing a power supply for welding equipment, a second plug means connected to the alternator windings for providing a power supply for high voltage appliances, a step-up transformer rectifier means connected to said second plug means, means for causing said battery to remain permanently connected under running conditions with the field coil and voltage regulator, a double pole single throw switch, first pole means of said switch closing for connecting normal shunt excitation with voltage regulation of the alternator for normal supply inside the vehicle and opening for disconnecting normal shunt excitation and connecting only battery excitation, thus effectively disabling the voltage regulation of the alternator output voltage, and a single pole normally closed relay having a coil, a second pole means of said switch closing for connecting the coil of said relay between said delta connection and ground said charge warning light being connected via the normally closed points of said relay between said battery and ground.

2. A power system for a motor vehicle alternator as claimed in claim 1 in combination with a fast battery charging accessory including a plug socket connectible with said first plug means, a pair of charging cables and a resistor connected in series therewith.

* * * * *